United States Patent [19]

Buard

[11] Patent Number: 4,627,469
[45] Date of Patent: Dec. 9, 1986

[54] COMPOSITE STRUCTURE DUCT

[75] Inventor: Yvon Buard, Voutre, France

[73] Assignee: Legrand, Limoges, France

[21] Appl. No.: 679,215

[22] Filed: Dec. 7, 1984

[30] Foreign Application Priority Data

Dec. 7, 1983 [FR] France ............................... 83 19563

[51] Int. Cl.[4] ............................................. H02G 3/04
[52] U.S. Cl. .................................... 138/92; 138/117; 138/151; 174/101
[58] Field of Search ................. 138/116, 117, 151, 92; 174/95, 97, 101

[56] References Cited

U.S. PATENT DOCUMENTS

| 291,371 | 1/1884 | Mayall | 138/151 X |
| 1,727,772 | 9/1929 | Hotchkin | 138/151 X |
| 2,478,006 | 8/1949 | Paden | 339/29 R |
| 3,093,219 | 6/1963 | Ramme | 138/117 |
| 3,126,444 | 3/1964 | Taylor | 174/101 |
| 3,229,029 | 1/1966 | Weiss | 174/101 |
| 3,347,275 | 10/1967 | Murphy | 138/116 |
| 3,554,236 | 1/1971 | Rhodes | 138/117 |
| 3,727,644 | 4/1973 | Kagan | 138/92 X |
| 3,821,688 | 6/1974 | Larsile | 174/97 X |
| 3,927,698 | 12/1975 | Johannsen | 174/97 X |
| 4,269,231 | 5/1981 | Happer | 138/116 X |
| 4,270,020 | 5/1981 | Kenworthy | 174/48 |
| 4,423,284 | 12/1983 | Kaplan | 174/101 |

FOREIGN PATENT DOCUMENTS

| 2018050 | 11/1971 | Fed. Rep. of Germany | 138/116 |
| 2303593 | 10/1973 | Fed. Rep. of Germany | 174/97 |
| 2352397 | 8/1974 | Fed. Rep. of Germany | |
| 1469175 | 2/1967 | France | |
| 2433701 | 3/1980 | France | |
| 1500561 | 2/1978 | United Kingdom | 174/101 |

Primary Examiner—Stephen Marcus
Assistant Examiner—Mark Thronson
Attorney, Agent, or Firm—Charles E. Brown; Charles A. Brown

[57] ABSTRACT

A duct for wiring comprises a plastic body member of U-shaped cross section and a plastic cover adapted to be received at an open end of the body member. The sidewalls of the body member are equipped with metal or plastic casing elements. The casing elements are clipped, preferably with detenting action, on the sidewalls of the body member by means of grooves and tongues on the respective parts. Another casing element may be provided on the cover and is adapted to be clipped on the body member proximate the open end. The base wall of the body member normally has no casing element and may accommodate a fastener for securing the duct to a support. A so-called connecting casing element may be provided in place of a plain casing element in order to assemble or group together two or more such ducts. In this event the connecting casing element connects the body members of two or more ducts.

21 Claims, 13 Drawing Figures

COMPOSITE STRUCTURE DUCT

BACKGROUND OF THE INVENTION

The present invention relates generally to ducts and other conduits of the type employed in skirting or on walls in buildings for housing electrical conductors, cables, wires and other lines.

Generally speaking, such a duct comprises a body of U-shaped cross section and a cover adapted to close off the open end of the body.

At the present time the body as well as the cover is usually made of plastic. Yet to satisfy certain aesthetic considerations or for reasons of mechanical strength ducts have already been contemplated in which the body and the cover are both made of metal, and more particularly aluminum. But such ducts are inevitably expensive which has restricted their use.

Further such aluminum ducts are not electrically insulating which is a source of danger since the duct is adapted to house electrical wires.

OBJECT AND SUMMARY OF THE INVENTION

According to a general object of the invention there is provided a device which permits the association of an inner member in practice of plastic and an outer member, for example, of metal, secured thereto to overcome the aforesaid drawbacks and provide additional advantages.

According to the invention there is provided a duct comprising a body member of plastic material having a U-shaped cross section and a cover adapted to close off the body member. The duct is characterized by the body member having on an outer surface external engagement means fittingly engageable with complementary engagement means on a casing element. The associated casing element may be a metal casing element, e.g. of aluminum. Another casing element encases the cover. Thus there is preferably a separate casing member for each side of the body member.

According to a first embodiment the casing elements are of sufficient thickness and therefore of mechanical strength to be handled alone. They may then be delivered separately of the body member with which they are associated so that they may be mounted, as a final operation, after the duct has been installed so that the casing elements are spared the inevitable splattering and nicking which occur on premises where such a duct is being installed.

Alternatively, according to a second embodiment, the casing element associated with the body member of the duct may be mounted in place prior to marketing, such an arrangement equally applies to the cover. The duct is then delivered to the customer equipped with the casing elements in position.

In any event the duct maintains its insulating construction, in particular in line with its base wall which is preferably devoid of any casing element, at least in the main zone of the base wall, and therefore the base wall may be secured by any suitable fastening means to a metal support without the fastener being in contact with a metal casing element. Alternatively, the duct may be secured to the support by a suitable-adhesive.

For reasons of physical appearance, the casing elements may comprise decorative trim to satisfy aesthetic requirements.

Advantageously, the production cost of such a duct is substantially less than that of metal duct constructions. Likewise the total weight of the duct is less than that of metal duct constructions since the casing elements of the composite duct construction of the present invention when they are thick enough to comprise stiffening or reinforcing members for the body member and/or cover do not unduly increase the total weight of the duct.

Obviously, the casing members are not necessarily of metal although such a material is particularly suitable. The casing elements may also be made of plastic depending on the desired appearance. It is therefore possible to provide casing elements of contrasting color with respect to the color of the body member and/or cover which are preferably made of insulating plastic material.

In any event the duct in accordance with the invention is characterized by a composite structure comprising in addition to the body member and the cover, at least one casing element fitted on the body member or cover.

Such is not the case with known ducts and namely those disclosed in German DAS No. 2,352,397 and French printed patent application No. 2,433,701. In each of the publications a cover is removably fitted on the U-shaped body member to close off the same but there is no disclosure of a casing element adapted to be fitted on the body member.

Furthermore, according to a development of the present invention, the casing elements are adapted for use on modular design components. According to such an embodiment the casing elements have an additional function of an assembly or connecting member adapted to secure the one body member to another body member of another duct. It is therefore advantageously possible to interconnect modular trunking units which opens new fields and applications of the duct according to the invention.

These and other features and advantages of the invention will become apparent from the description which follows, given by way of example, with reference to the accompanying disgrammatic drawings.

DESCRIPTION OF THE PREFERRED EMBODIMENTS

The various embodiments illustrate a duct 10 according to invention generally comprising, as known per se, a body member 11 of plastic material having a U-shaped cross-section and a cover 12 adapted to close off the open end of the body member.

The body member 11 which in practice is made by extrusion is of one-piece construction and comprises a base wall 14 and a sidewall 13 disposed along each of the longitudinal edges of the base wall 14.

In the illustrated embodiments the base wall 14 has a compartmented structure in cross section. The base wall 14 is thus formed of two parallel walls 14A, 14B spaced from each other and connected to each other by longitudinally extending internal partitions 15.

Further, the outer or lower surface of the base wall 14 has spaced apart, longitudinally extending, projecting stiffening ribs 16 which are in practice in alignment with the respective internal partitions 15.

The width of the base wall 14 may be of any desired dimension. In practice two different widths L1, L2 (measured between the corresponding sidewalls 13) may be provided. For the shorter width L1 no partitioning is provided on the inner or upper surface of the base wall 14. On the other hand for the longer width L2 one or more longitudinally extending partitions 17 (shown in dash-dot lines in FIG. 4 and solid lines in FIG. 12) may be provided protruding from the inner or upper surface of the base wall 14 at spaced locations.

In the illustrated embodiments, the at least one partition 17 may be of double-wall construction along at least part of its height starting from the base wall 14.

In the illustrated embodiments the sidewalls 13 perpendicular to and at either side of the base wall 14 are of substantially equal heights H measured from the base wall 14.

In the embodiments of FIGS. 1-11 the sidewalls are of plain wall construction and, like the base wall 14 have spaced apart, longitudinally extending stiffening ribs 16 protruding from their outer surfaces.

According to the invention the body member 11 has external engagement means enabling securement by simple interfitting engagement on at least part of its outer surface a casing element equipped with complementary engagement means.

In practice in the illustrated embodiments there is thus provided a separate casing element 19 for each of the sidewalls 13 of the body member 11.

In other words in these embodiments only the outer surfaces of the sidewalls 13 of the body member 11 are covered by such casing elements, and the outer surface of the base wall 14 being devoid of any such casing element at least along its main zone.

In the FIGS. 1-6 embodiment the cross section of casing elements 19 fitted on the sidewalls 13 of the body member 11 are identical and generally L-shaped and are arranged in symmetrical relation with respect to a longitudinal center line of symmetry of the body member 11. Each L-shaped casing element 19 forms cladding for the body member 11 and comprises two legs 21, 22 which are joined to each other by a large fillet and are substantially at right angles to each other.

The shorter leg 21 which extends transversely and is adapted to overlie the edge of the open end of the U-shaped body member 11, which is parallel to the base 14. The longer leg 22 extends laterally and parallel to the sidewalls 13 and in overlying relation with respect to one such sidewall 13.

The engagement means interconnecting the body member 11 and one such casing element comprises, first of all, on the body member 11, a groove 23 at the upper end of the body member 11 in the vicinity of the open end 24. The groove 23 extends parallel to the center line of the open end 24. The casing element 19 has a tongue 26 engageable and detentable in the groove 23.

In practice, in the illustrated embodiment of FIGS. 1-6, the groove 23 provided on the body member for detenting engagement with the corresponding casing element 19 is defined between two tongues 28, 29 on the body member 11. A first tongue 28 lies substantially in alignment with the corresponding sidewall 13 and the second tongue is substantially parallel to the first tongue and protrudes from a ledge 30 extending inwardly from the sidewall 13 toward the opposite sidewall 13.

In the embodiment of FIGS. 1-6 the groove 23 is in practice separate from the groove 32 provided for the engagement of the cover 12, as will be described below. The groove 32 is provided inwardly of the groove 23 and toward the free edge of the ledge 30.

Further, in the FIGS. 1-6 embodiment the tongues 28, 29 defining the groove 23 have longitudinal beads 33 running along their free edges so as to define a throat of reduced section for the tongue 26 of the corresponding casing element 19. Likewise, the free edge of the tongue 26 of the casing element has a longitudinal bead 34 running along its free edge. In practice, bead 34 protrudes essentially to the side of the tongue 26 facing away from the associated longer leg 22. In practice the shorter leg 21 of the casing element 19 extends inwardly beyond tongue 26 from which it depends, so as to overlie the bead 33 on the associated tongue 29 on the body member 11. In any event the tongue 26 carried by the shorter leg 21 of the casing element 19 extends substantially parallel to the longer leg 29 thereof.

In the FIGS. 1-6 embodiment the engagement means arranged between the body member 11 and the casing member 19 further comprise on the body member 11 a groove 35 extending laterally of and parallel to a corresponding sidewall 13 and a tongue 36 complementary in configuration to the groove and adapted to be fitted therein. In practice, in these embodiment the groove 35 in the body member 11 is formed between the sidewall 13 and a tongue 37 fixed relative to the sidewall 13 and protruding from an extension 38 of the base wall 14, the tongue 37 being parallel to the sidewall 13 at the lower end thereof adjacent the connecting zone of the sidewall 13 and the base wall 14. Conjointly, the tongue 36 of the casing element 19 extends parallel to the leg 22 thereof proximate to the free edge of the leg 22 and projects toward the free edge from a ledge 39 perpendicular to and connected to longer leg 22.

Moreover, in the illustrated embodiments, the cover 12 also comprises a web 40 of plastic material with which is associated a casing element 42 which forms cladding for the cover 12. In practice, in the embodiments of FIGS. 1-11, the casing element 42 which overlies the exterior of the web 40 encases the longitudinal edges 43 thereof and the casing element 42 is equipped with engagement means for detachably securing the cover 12 to the body member 11.

The engagement means comprises a rounded bead 44 extending along the free edge of each of two right-angle bends 45 on the casing element 42 which overlie the corresponding edges 43 of the web 40 and a tab 46 extends from each bead 44 parallel to the main part of the casing element 42 and grips the lateral edge 43.

The beads 44 on the cover 12 are cooperable with beads 33 on tongues 29 formed on the body member 11 while the tabs 46 on the casing element 42 are adapted to abut against the edge of shoulder 48 bounding the grooves 32.

The web 40 of the cover 12 has spaced-apart longitudinally extending and outwardly projecting stiffening ribs 16. On the other side of the web 40 shoulders 50 with inclined outer flanks are provided for guiding the cover 12 into place on the open end of the U-shaped body member 11.

Figure 1:
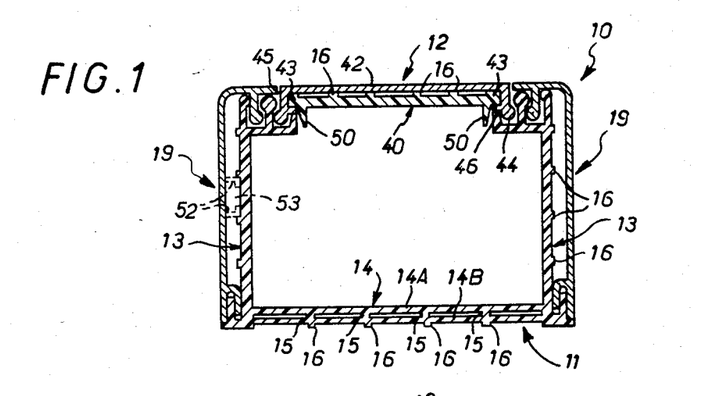
FIG. 1 is a cross-sectional view of duct embodying the present invention.
Figure 2:
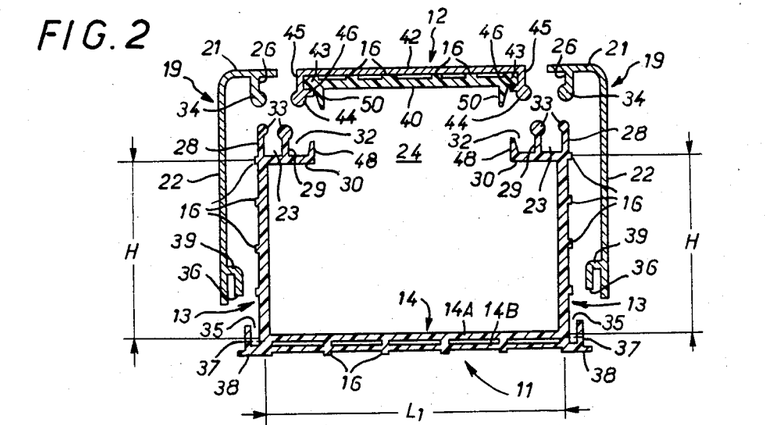
FIG. 2 is an exploded view of the duct as illustrated in FIG. 1.

As illustrated in FIG. 2 the casing elements 19 for the body member 11 may be separable from the body member and delivered separate from the rest of the duct. The same applies to the casing element 42 for the cover 12 although it is preferably delivered mounted in position on the cover 12 since the engagement means for the cover are provided on the casing element 42.

After wiring or other lines are installed in the body member of the duct 11 the cover 12 is mounted on the body member 11 by interengagement and detenting action of the beads 44 on the casing element 42 in the corresponding grooves 32 on the body member 11.

The casing elements 19 and 42 are illustrated as being smooth surfaced. Obviously they may be ribbed or striated or have other projections or patterns for the desired visual effect or appearance. Likewise the shorter leg 22 of each or both of the casing elements 19 may have two inward projections, as schematically illustrated in chain-dotted lines in FIG. 1 for one of the casing elements 19, defining therebetween a groove 53 for accommodating, where appropriate, a screw or other component for grounding the wiring or other lines carried by the duct.

In any event, instead of being manufactured of metal, one or more the casing elements 19, 42 may be made of plastic material of any desired color to match or contrast with the body member 11 or cover 12 on which it is or they are to be mounted.

According to the embodiment of FIGS. 3-6 a casing element 19 mounted on the body member 10 of a duct is more than a mere casing element but constitutes an assembly element, i.e. a connecting member, having engagement means adapted to provide securement of the body member 11 to another, similar duct 10.

Figure 3:
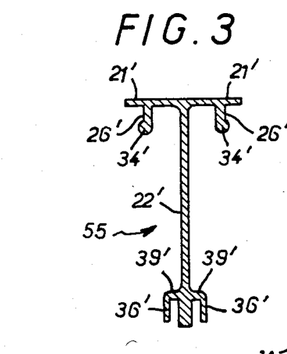
FIG. 3 is a cross-sectional view of a connecting casing element adapted to interconnect body members of two adjacent ducts.
Figure 4:
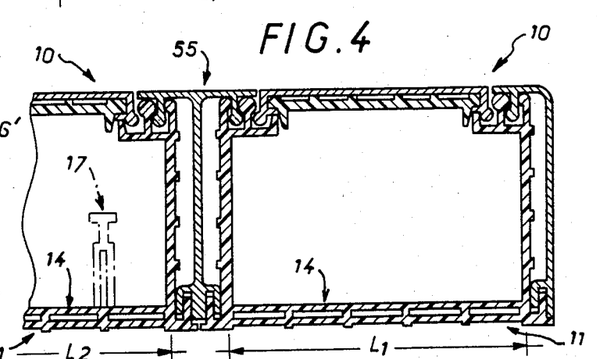
FIG. 4 is a partial cross-sectional view illustrating the function of the connecting casing element interconnecting body members of two adjacent ducts.

In the embodiment of FIGS. 3 and 4 the casing element 55 comprises a connecting component adapted to interconnect the body members 11 of two ducts 10 side by side. A single casing element 19 encases the corresponding facing sidewall of each of the body members 11. Like reference numerals will be used to designate like parts.

The connecting casing element 55 comprises a central web 22' having a tongue 36' at the end of a ledge 39' on each side of the central web 22' proximate the lower end thereof, and two limbs 21' extending from the upper end of the central web having depending tongues 26' set back from the free longitudinal edges of the limbs 21', with round beads 34' at their free ends.

The connecting casing element 55 thus described therefore is generally of T-shaped configuration and it is adapted to clip into grooves 23 and 35 by means of tongues 26' and 36' formed on the body members 11 of two side-by-side ducts replacing a normal casing element 19 for the corresponding sidewalls of the respective body members 11. The body members 11 of the connected ducts 10 may be of the same width or one may have a width L1 and the other a different width L2.

Figure 5:
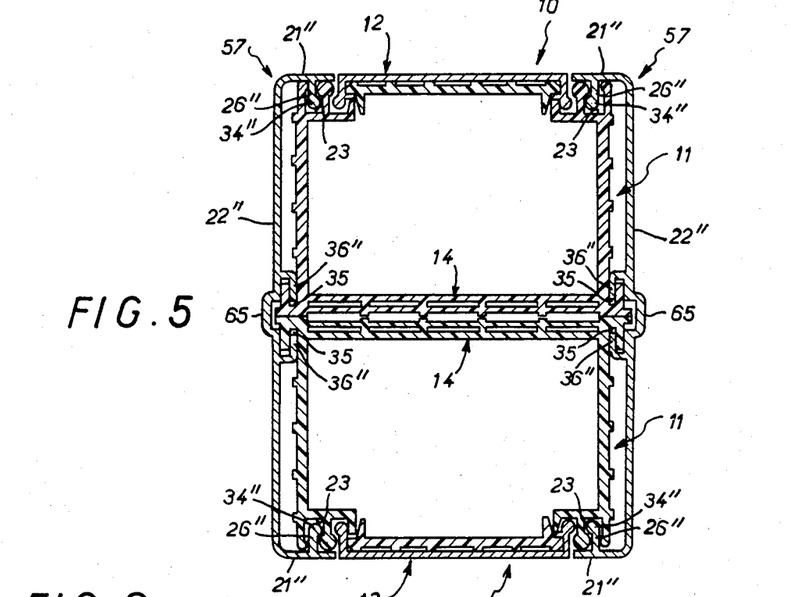
FIG. 5 is a view similar to that of FIG. 4 illustrating another type of connecting casing element for interconnecting the body members of two adjacent ducts.

According to the embodiment of FIG. 5 the adjacent ducts are connected together by means of the base walls 14 of their body members 11. In this case the width of each body member 11 may be L1 or L2.

In conformity with this embodiment two connecting casing elements 57 are utilized, each one of which overlies one of the sidewalls 13 of its body member 11. Each of the connecting casing elements 57 comprises a pair of casing elements 19 joined end to end along their longitudinal edges.

Such a connecting casing element 57 is therefore generally U-shaped and comprises a central portion 22' having tongues 36" projecting toward each other in its median zone and two short side legs 21' having tongues 26' with beads 34" at their free edges.

By means of tongues 26" and 36" each of the connecting casing elements 57 is engaged by detenting action or by smooth sliding engagement into corresponding grooves 23 and 35 in the body members 11 to be connected. It will be readily understood that two ducts 10 thus arranged in back-to-back relation may together form an upright or post.

Figure 6:
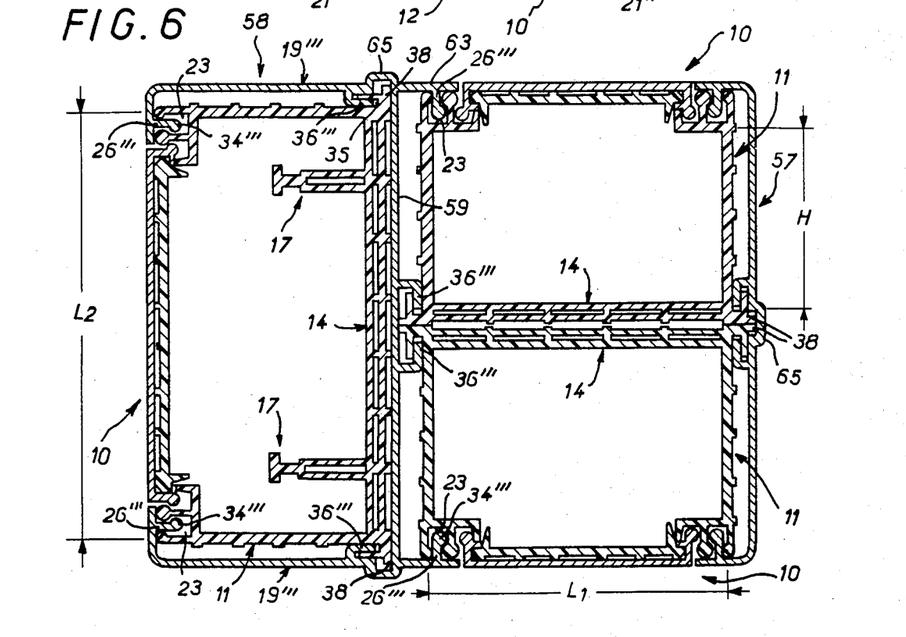
FIG. 6 is a view similar to that of FIG. 4, showing casing elements interconnecting a plurality of body members.

The same applies to the alternative embodiment of FIG. 6 wherein three ducts are grouped together by adding to two ducts 10 whose body members 11 have a transverse width L1, as illustrated, or a transverse width L2, an extra duct 10 whose body member has a transverse width L2 by arranging the last mentioned duct laterally with respect to the first two ducts and thereby with the base wall 14 of the extra duct 10 perpendicular to the base wall of the first two ducts 10. The width L2 is selected to correspond substantially to double the height of the sidewall 13 (including base wall) of the first or second duct.

Beside a connecting casing element 57 disposed on the opposite side of the extra duct 10 of larger width L2, there is provided a connecting casing element 58 which encases the body member 11 of the extra duct 10 of greater width L2 and which has to each side of a central portion 59 two legs 19''' which, like casing elements 19, each have a tongue 26''' with a rounded bead 34''' and a tongue 26''' for engagement respectively in grooves 23 and 35 of the body member 11.

On its outer surface the central portion 59 of the connecting casing element 58 comprises in its middle area directed toward each other two tongues 36''' for engagement in grooves 35 in the body member 11 of the ducts 10 arranged back to back and beyond the central portion each of the side legs 19''' has an extension 63 with a tongue 26''' and a rounded bead 34''' for engagement in a groove 23 in the respective body member 11.

In the foregoing embodiments the connecting casing elements 57 and 58 longitudinally form a projection in line with the corresponding extension(s) 38 of the base wall 14 of the related body members 11 to enclose the extensions(s) 38.

Such is not the case with the embodiment of FIGS. 7–11. In this embodiment the engagement means are not effective along the sidewalls 13 of the body member 11.

Figure 7:
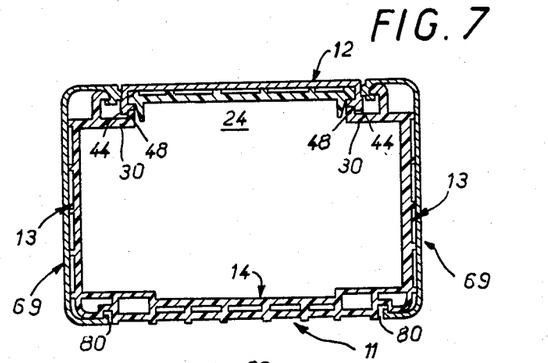
FIG. 7 is a cross-sectional view similar to that of FIG. 1 relative to another embodiment.
Figure 8:
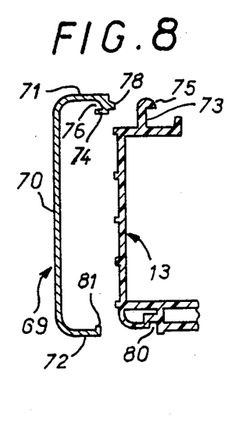
FIG. 8 is an exploded detail view showing part of the embodiment of FIG. 7.

In this embodiment the cross section of each of the casing elements 69 associated with the sidewalls 13 of the body member 11 has a generally U-shaped configuration. Such a casing element 69 comprises two substantially parallel legs 71, 72 disposed respectively on opposite sides of the central portion 70.

In conjunction therewith the engagement means adapted to operate between the body member 11 and such a casing element 69 comprises, first of all, on the outside of the body member 11 a tongue 73 proximate to the open end 24 and parallel to a longitudinal edge thereof and, on the casing element 69, a shoulder 74 projecting from leg 71 which is adapted to hook onto the tongue 73 on the body member 11.

In practice, in the illustrated embodiment, the tongue 73 on the body member 11 has in a direction extending away from the casing element 69 a shoulder 75 complementary to a groove 76 provided on the inner surface of shoulder 74 of the casing element 69.

In this embodiment, the shoulder 74 on the casing element 69 has engagement means adapted to clip on the corresponding edge of the cover 12. In practice the engagement means comprises a bead 78 of convex curvature corresponding to the hollow or concave curvature of the associated groove 76.

By means of the corresponding bead 44 on the cover casing element 42 which has an angular cross section in the illustrated embodiment, the cover 12 is adapted to be clipped directly on the bead 78 of the cover casing element 69.

In this event, special grooves are not provided on the body member 11 for clipping on the cover 12. But, as above, the ledges 30 with tongues 48 limit the insertion of the cover 12 into the open end 24 of the body member 11.

In conjunction therewith, the engagement means between the body member 11 and the casing element 69 comprises at the lower end and on the body member 11 a groove 80 which is provided on the outer or under surface of the back wall 14 and, on the casing element 69, a lip 81 protruding from its leg 72 for hooking into groove 80 on the back wall 14.

Figure 9:
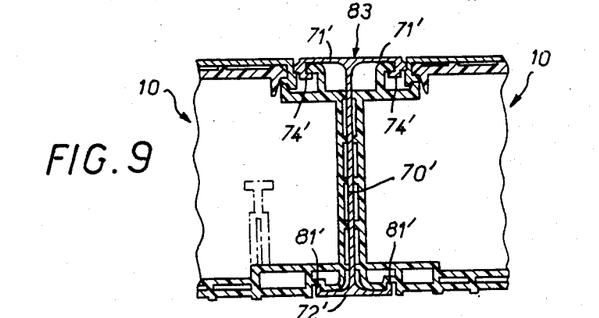
FIGS. 9, 10 and 11 are partial cross-sectional view for an alternative embodiment corresponding respectively to FIGS. 4, 5 and 6.
Figure 10:
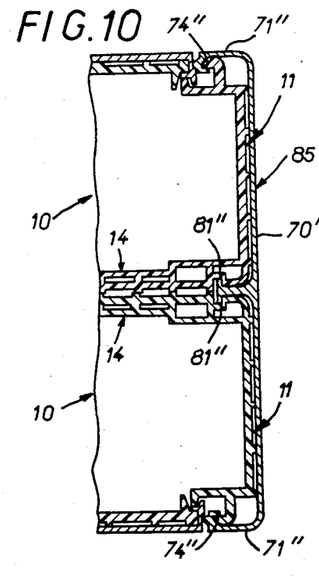
Figure 11:
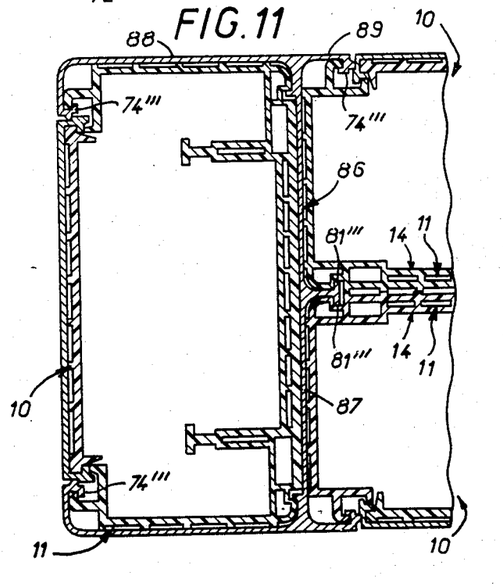

As above, and illustrated in FIGS. 9–11 connecting casing elements 69 may replace the simple casing elements 69 in order to group two or three ducts 10 together.

In FIG. 9 it is a question of assembling together in side-by-side relation two ducts 10; the connecting casing element 83 comprises an I-shaped component including a web 70', limbs 71' at one end with shoulders 74' and limbs 72' at the other end with lips 81'; corresponding respectively to the central portion 70 and legs 71, 72 of the casing element 69.

In FIG. 10, two ducts of the same width are assembled together back to back. To this end, the same arrangement as above is employed, two connecting casing elements 85 each including a central portion 70" with lips 81" opposite each other in the central portion 70" and two legs 71" with lips 74", the lips 81" and 74" being respectively similar to the lips 81 and 74 of the casing element 69.

In the embodiment of FIG. 11 three ducts 10 are assembled together of which two ducts have their back walls 14 back to back and the third duct is disposed transversely as disclosed above with reference to FIG. 6. In addition to a connecting casing element 85 (not illustrated) there is provided a connecting casing element 86 including a central portion 87 with lips 81''' disposed in opposite directions on the central portion 87 and two legs 88 with lips 74''' and extensions 89 likewise with lips 74''. The lips 81''' and 74''' are respectively similar to the lips 81 and 74 on the casing element 69.

Figure 12:
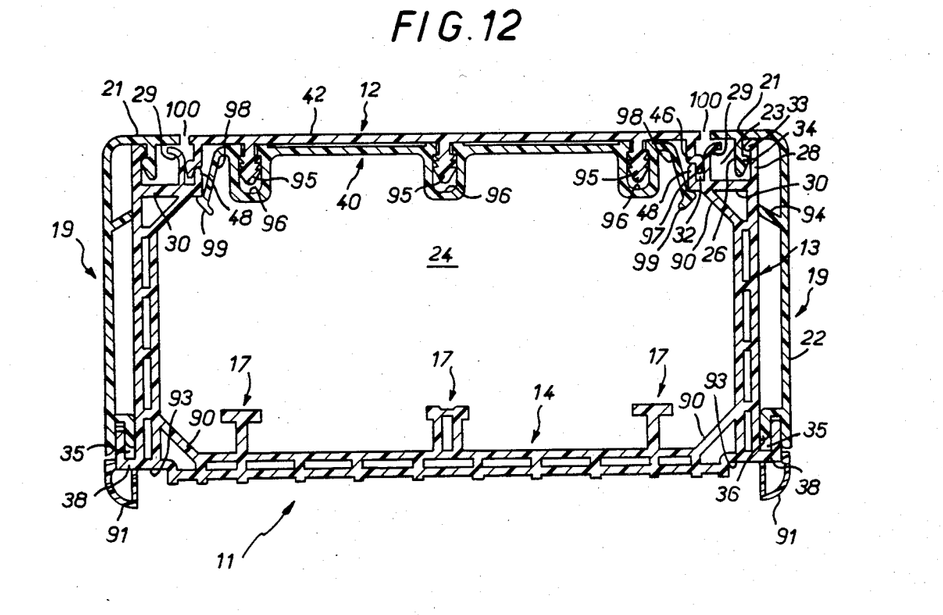
FIG. 12 is a cross-sectional view similar to that of FIG. 1 relative to another embodiment.
Figure 13:
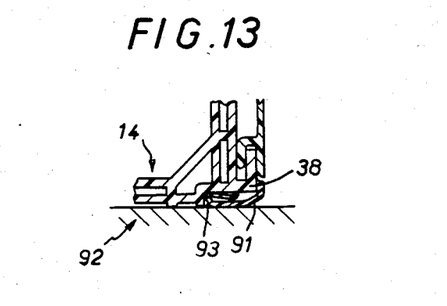
FIG. 13 is a detail view showing part of the FIG. 12 embodiment and illustrating the assembly operation for this embodiment.

FIGS. 12 and 13 relate to an alternative embodiment to that described above with reference to FIGS. 1 and 2.

In this embodiment the inner surface of the back wall 14 of the body member 11 has three T-shaped interior partitions 17 of which at least the one extending along the center line of the back wall 14 is preferably, as shown, double-walled along its entire height. The central partition 17 may be used for clipping or mounting a separator or securing any electrical or mechanical component. Further, the partitions may be utilized for locating nails or screws for securing the ducts to a support.

The edges of the base wall 14 of the body member 11 are joined to the sidewalls 13 by oblique panels 90, for example at an angle of 45°, which stiffen or reinforce the corresponding corners of the body member 11.

On the outside surface of the base wall 14 of the body member 11 deformable beads 91 are provided which run along the edges, and in practice along the lower or under surfaces of extensions 38. In practice the deformable beads 91 are hollow and made of a material which is more flexible that that of the rest of the body member 11, or formed by a thin section of the same material in one-piece construction with the body member 11. The hollow deformable bends 91 are adapted to be flattened or collapse when the body member 11 is applied by its base wall 14 against a support 92 (see FIG. 13), thereby overcoming any possible irregularities in the planeity of the support surface and improving the overall appearance of the duct in situ.

In order that the base wall 14 be able to accommodate the hollow deformable beads 91 when flattened, the extensions 38 are set back thereby providing a recess 93 adapted to accommodate the flattened beads 91.

In the illustrated embodiment the hollow deformable beads 91 are generally quarter circle in section and are attached by each of their radial sides to the corresponding extension 38 of the base wall 14.

Moreover, as with the base wall 14, the sidewalls 13 of the body member 11 has a compartmented wall structure, double-walled with internal partitions in this embodiment, and oblique panels 90 inclined at 45°, connecting the sidewalls to their ledges 30 for stiffening the corresponding corners of the body member 11. As above, each of the ledges 30 has a groove 23 and a groove 32. However, instead of having a bead 33 the tongue 29 separating the two grooves has an arcuate edge directed toward the associated tongue 28 which has a bead 33.

As above, each of the casing elements 19 has an L-shaped configuration with a short leg 21 at the open end 24 provided with a tongue 26 having a bead 34 for engagement in a groove 23 in the associated sidewall and cooperating by detenting action with the bead 33 on tongue 28. The beads 33 and 34 are pawl-shaped and face each other (head to tail) in this embodiment. Each casing elements 19 further comprises a long leg 22 having a tongue 36 for engagement in a groove on the associated sidewall 13.

But in this embodiment to enforce the latching action by the engagement means, each one of the casing elements 19 further comprises projecting from the inner surface of its long leg 22, and proximate to the short leg 21, an oblique tongue 94 directed toward the shorter leg 21 and therefore toward the detenting tongue 26 carried thereon. The free edge of the oblique tongue 94 is adapted to abut against the associated sidewall 13 of the body member 11.

Moreover, in this embodiment, the cover casing element 42 which carries the cover has longitudinally extending ribs projecting from the inner surface thereof. The sides of the ribs 95 are barbed for securement to the web 40 of the cover 12. The ribs 95 are force fitted in grooves 96 provided in the web 40 which facilitates the manufacture and assembly of the unit.

The cover casing element 42 bears through a longitudinal edge against a tongue 48 on the corresponding sidewall 12 as above. In the FIG. 13 embodiment the tongue 46 supports, in turn, perpendicular to its main section a lip 97 which is engaged in a groove 32 on the associated sidewall 13 of the body member 13. In addition, in cooperation with the bearing of the cover casing element 42 against the tongue 48 on sidewall 13, the clipping of the entire cover assembly on the body member is effected through the associated web 40 which has along each one of its longitudinal edges a lip 98 which extends obliquely downwardly. Each lip 98 has an oblique engagement surface 99, inclined in the opposite direction, which is adapted to hook beneath the ledge 30 on the associated sidewall 13 after momentary elastic deformation caused by the engagement of the oblique engagement surface 99 with the tongue 48 at the free end of the ledge 30.

Finally, in this embodiment a space or clearance 100 is provided between each of the longitudinal edges of the casing element 42 of the cover 12 and the corresponding edges of the shorter legs 21 of the casing elements of the sidewalls 13. This space or clearance facilitates dismounting of the cover 12 and/or the casing element 19 by inserting the blade of a tool such as a screwdriver and exerting a prying action.

As above, the casing element may be of metal or plastic material.

It will be understood that the present invention is not limited to the illustrated and described embodiments but encompasses all modifications and alternatives and expedients understood to those skilled in the art without departing from the spirit and scope of the invention.

For instance, the cover may be of one-piece construction, either of metal or plastic material.

In any event, the casing elements according to the invention may have other functions than those related to the external appearance of the duct. For example, the casing elements may serve as a support for any kind of decorative element such as carpeting or marking element. To this end, the casing element may have grooves, projections or the like adapted to locate and to secure, e.g. by clipping, such a decorative or marking component.

What is claimed is:

1. A duct comprising a body member of plastic material and having a U-shaped cross section and having opposed sidewalls, a base wall and an open end, a cover for closing off said open end of said body member, a first metal casing element for cladding an outer face of one of said sidewalls of said body member, a second metal casing element for cladding an outer face of the other of said sidewalls of said body member, said body member having external engagement means, said casing elements each having complementary engagement means fittingly engageable with said external engagement means for securing said casing elements on said body member.

2. The duct according to claim 1, wherein said external engagement means and said complementary engagement means are adapted to releasably clip said casing elements on said body member.

3. The duct according to claim 1, wherein said external engagement means and said complementary engagement means are engageable by detenting action to releasably clip said casing elements on said body member.

4. The duct according to claim 1, wherein said external engagement means comprises a groove provided on said body member proximate to each edge of said open end and extending parallel to a respective edge of said open end, and said complementary engagement means comprises a tongue detentably engageable with each groove for releasably securing each casing element on said body member.

5. The duct according to claim 4, wherein further comprising another groove provided on said body member cooperable with an edge of said cover for releasably clipping said cover to said body member.

6. The duct according to claim 1, wherein said external engagement means comprises a tongue on said body member proximate to said open end at each edge of said open end and extending parallel to a respective edge of said open end, each said casing element having a leg, said complementary engagement means comprising one shoulder projecting from said leg for releasably hooking onto a respective one of said tongues.

7. The duct according to claim 6, wherein there is a groove formed on an inner surface of said one shoulder on the respective casing element, and each tongue has another shoulder complementary to said groove.

8. The duct according to claim 6, wherein said one shoulder on each casing element has additional engagement means for detentable engagement with a corresponding edge of said cover.

9. The duct according to claim 1, wherein each of said external engagement means comprises a groove provided on the associated sidewall of said body member and extending parallel thereto, and said complementary engagement means comprises a tongue complementary to said groove.

10. The duct according to claim 9, wherein there is another tongue integral with said associated sidewall and parallel thereto, and said groove is formed between the associated sidewall and said another tongue.

11. The duct according to claim 9, wherein said groove is located at a lower end of the associated sidewall adjacent its connection with said base wall of said body member disposed opposite said open end.

12. The duct according to claim 9, wherein each of said casing elements has a generally L-shaped cross section with legs substantially at right angles to each other.

13. The duct according to claim 1, wherein said external engagement means comprises a groove formed in an outer surface of said base wall of said body member opposite said open end, at least one of said casing elements comprising a leg and said complementary engagement means comprising a lip projecting from said leg so that said at least one casing element hooks onto said base wall.

14. The duct according to claim 13, wherein each of said casing elements is generally U-shaped in cross section and comprises two substantially parallel legs disposed on respective sides of a central portion.

15. The duct according to claim 12, wherein each of said casing elements has a tongue projecting from an inner surface and including a free edge adapted to bear against the respective sidewall of said body member.

16. The duct according to claim 1, said cover having a web, and there being another casing element cooperable with said web.

17. The duct according to claim 16, wherein said web has sides and remote edges, said another casing element encases one of said sides and said remote edges of said web, said another casing element having other engagement means for detentably engaging said another casing element with said web on said body member.

18. The duct according to claim 16, wherein one of said sidewalls has a ledge, and said web has along one of its edges a lip adapted to releasably hook beneath said ledge.

19. The duct according to claim 1, wherein one of said casing elements defines a connecting casing element having other engagement means cooperable with other complementary engagement means on a body member of another duct for securing said duct and said other duct together.

20. The duct according to claim 1, wherein said body members is of a one-piece construction.

21. A duct comprising a body member of plastic material and having a U-shaped cross section and defining opposed sidewalls, a base wall and an open end opposite said base wall, a cover for closing off said open end of said body member, metal casing elements for cladding an outer face of each of said sidewalls, and a metal casing element for cladding said cover, said body member and said cover having first engagement means and said casing elements having complementary second engagement means fittingly engageable with respective ones of said first engagement means, and means for releasably mounting said cover and said casing element for said cover at said open end whereby said cover and said casing element for said cover are removable in unison from said body member.

* * * * *